United States Patent
Jachmann

(10) Patent No.: US 11,624,823 B2
(45) Date of Patent: Apr. 11, 2023

(54) SAFETY LASER SCANNER AND METHOD FOR MAINTAINING OPERABILITY

(71) Applicant: SICK AG, Waldkirch (DE)

(72) Inventor: Fabian Jachmann, Waldkirch (DE)

(73) Assignee: SICK AG, Waldkirch (DE)

( * ) Notice: Subject to any disclaimer, the term of this patent is extended or adjusted under 35 U.S.C. 154(b) by 738 days.

(21) Appl. No.: 16/593,411

(22) Filed: Oct. 4, 2019

(65) Prior Publication Data
US 2020/0110176 A1 Apr. 9, 2020

(30) Foreign Application Priority Data
Oct. 9, 2018 (DE) .......................... 102018124837.7

(51) Int. Cl.
*G01S 17/04* (2020.01)
*G01S 7/481* (2006.01)
*G01S 7/497* (2006.01)
G01S 7/4911 (2020.01)
G01S 7/4912 (2020.01)
G01V 8/10 (2006.01)

(52) U.S. Cl.
CPC .............. *G01S 17/04* (2020.01); *G01S 7/481* (2013.01); *G01S 7/497* (2013.01); *G01S 7/4911* (2013.01); *G01S 7/4912* (2013.01); *G01V 8/10* (2013.01)

(58) Field of Classification Search
CPC .... G01S 7/4863; G01S 7/4816; G01S 7/4876; G01S 17/93; G01S 7/4815; G01S 17/86; G01S 7/4913; G01S 17/894; G01S 17/89; G01S 7/484; G06T 2200/04; G06T 2207/10028
See application file for complete search history.

(56) References Cited

U.S. PATENT DOCUMENTS

2013/0187032 A1* 7/2013 Kawabata ............... G01S 17/04
250/214 SW

FOREIGN PATENT DOCUMENTS

| DE | 4340756 A1 | 6/1994 |
| DE | 19652440 A1 | 6/1998 |
| EP | 1876468 B1 | 1/2008 |
| EP | 2469296 B1 | 6/2012 |

(Continued)

OTHER PUBLICATIONS

European Search Report dated Jul. 19, 2019 for Corresponding EP Application No. 102018124837.7.

*Primary Examiner* — Tony Ko
(74) *Attorney, Agent, or Firm* — Nath, Goldberg & Meyer; Jerald L. Meyer

(57) ABSTRACT

A safety laser scanner for detecting objects in a monitored zone having a light transmitter for transmitting a light beam into the monitored zone; having a light receiver for generating a received signal from the light beam remitted by the objects; having a rotatable deflection unit for a periodic deflection of the light beam to scan the monitored zone in the course of the movement; having an internal reference target that reflects the transmitted light beam within the safety laser scanner to the light receiver to generate a reference signal; and having a control and evaluation unit that is configured to detect objects with reference to the received signal and to check the operability of the safety laser scanner with reference to the reference signal, The control and evaluation unit is here configured to change the sensitivity of the detection in dependence on the reference signal.

17 Claims, 1 Drawing Sheet

(56) References Cited

FOREIGN PATENT DOCUMENTS

| EP | 3091271 A1 | 11/2016 |
| EP | 3163322 B1 | 5/2017 |
| WO | 2015077614 A1 | 5/2015 |

\* cited by examiner

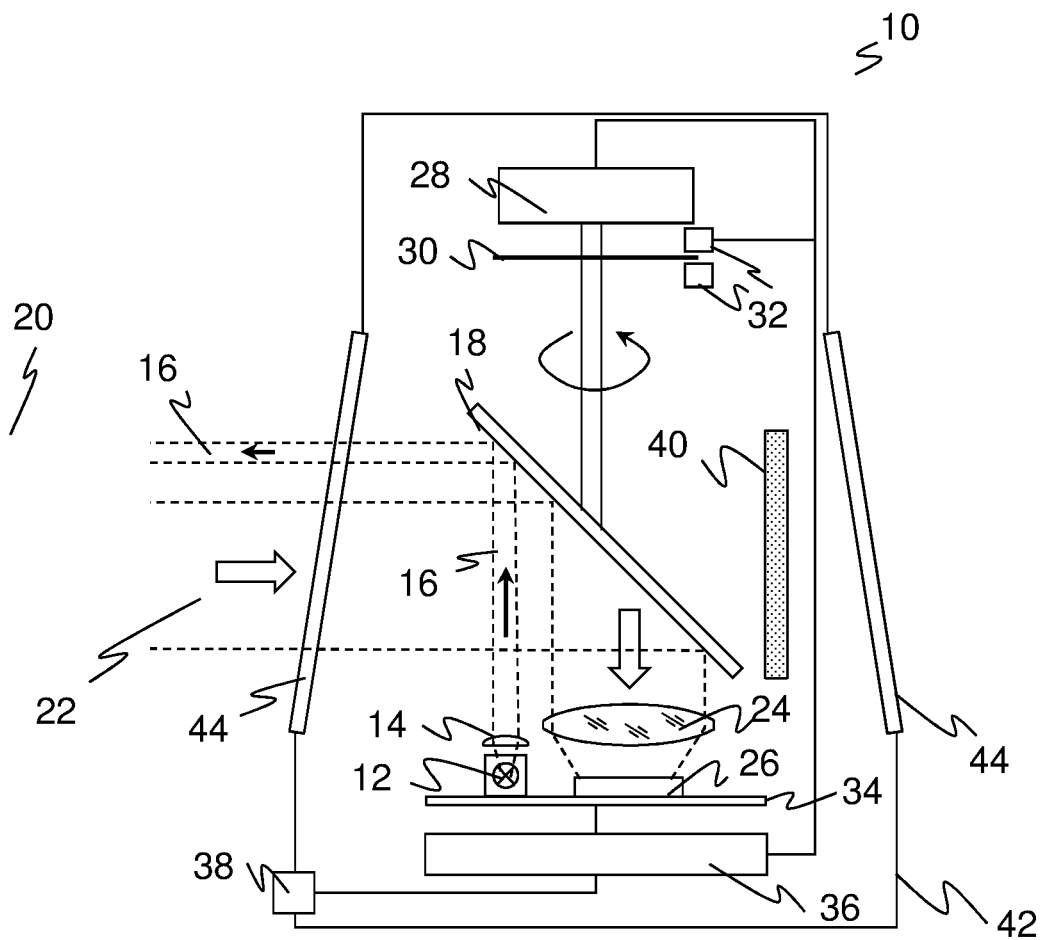

SAFETY LASER SCANNER AND METHOD FOR MAINTAINING OPERABILITY

FIELD

The invention relates to a safety laser sensor for detecting objects in a monitored zone and to a method for maintaining its operability in accordance with the preambles of the respective independent claim.

BACKGROUND

In a laser scanner, a light beam generated by a laser periodically sweeps over a monitored zone with the help of a deflection unit. The light is remitted at objects in the monitored zone and is evaluated in the laser scanner. A conclusion is drawn on the angular location of the object from the angular position of the deflection unit and additionally on the distance of the object from the laser scanner from the time of flight while using the speed of light. Two general principles are known to determine the time of flight for conventional laser scanners. In phase-based processes, the continuous transmitted light is modulated and the phase shift of the received light with respect to the transmitted light is evaluated. In pulse-based processes or pulse transit time processes, the transmitter works in single pulse operation at comparatively high pulse energies and the laser scanner measures object distances with reference to the time of flight between the transmission and reception of a single light pulse. In a pulse averaging process known, for example, from EP 2 469 296 B1, a plurality of individual pulses are transmitted for a measurement and the received pulses are statistically evaluated.

The location of an object in the monitored zone is detected in two-dimensional polar coordinates using the angular data and the distance data. The positions of objects can thus be determined or their contour can be determined. The third spatial coordinate can likewise be detected by a relative movement in the transverse direction, for example by a further degree of freedom of movement of the deflection unit in the laser scanner or in that the object is conveyed relative to the laser scanner. Three-dimensional contours can thus also be measured.

Safety laser scanners are not used for general measurement work, but are used in safety technology or in operator protection for monitoring a hazard source, such as a hazardous machine represents. Such a safety laser scanner is known from DE 43 40 756 A1. In this process, a protected field is monitored which may not be entered by operators during the operation of the machine. If the safety laser scanner recognizes an unauthorized protected field intrusion, for instance a leg of an operator, it triggers an emergency stop of the machine. Other intrusions into the protected field, for example by static machine parts, can be taught as permitted in advance. Warning fields are frequently disposed in front of the protected fields where intrusions initially only result in a warning to prevent the intrusion into the protected field and thus the securing in good time and so increase the availability of the plant. As a rule, safety laser scanners work in a pulse based manner.

Safety laser scanners have to work particularly reliably and must therefore satisfy high safety demands, for example the EN13849 standard for safety of machinery and the machinery standard EN61496 for electrosensitive protective equipment (ESPE). To satisfy these safety standards, a series of measures have to be taken such as a safe electronic evaluation by redundant, diverse electronics, functional monitoring, or special monitoring of the contamination of optical components, in particular of a front screen. The demands on self-diagnosis are differently high in dependence on the hazard potential, which is expressed, for example, by so-called performance levels.

One of the measures to satisfy the relevant standards is the use of an internal reference target system with whose aid the error-free distance measurement and its unimpaired sensitivity are checked. This reference target is optically scanned in every revolution of the deflection unit and the signal echo is evaluated with respect to the signal strength and the distance value. If the result of this self-test is negative, the device switches off in a safety relevant manner. It is customary to use a contiguous angular range exclusively for the reference target measurement. The carrier at which the deflection unit with motor, rotating mirror, and angular encoder is suspended is also located in this angular range.

A self test can in principle be subject to faults of a first and second kind. A fault of a first kind would be that the system no longer works, but that the self test does not reveal this. This must be avoided at all costs in a safety system. One typical demand is single fault safety, i.e. the system only does not recognize such a fault in the extremely unlikely case that two faults occur simultaneously by chance that are not based on a common cause. A fault of a second kind means that a safety relevant shutdown takes place even though the system is objectively still fully functional. This is never a safety problem and is thereby substantially less critical, but does reduce the availability and results in unwanted and cost-intensive standstills and in unnecessary repairs or device replacements.

The measurement at the internal reference target would now also open up the option of not switching off in a safety relevant manner in favor of availability on a failed self test, but rather to adapt the sensitivity of the system such that the reference measurement returns to the permitted range again. However, this is conventionally not done due to safety concerns. The level of the reference signal from the reference target is not solely dependent on the total sensitivity of the device, but can rather be influenced by the specific optical beam path of the reference target measurement that fluctuates over the temperature or can change due to aging. This is also called degradation of the reference target.

This degradation of the reference target precludes an adaptation of the sensitivity in a conventional observation due to the demand for single fault safety. If namely a degradation of the reference target were to generate too high a level of the reference signal and if the sensitivity of the device were accordingly lowered, dark targets at a maximum range will possibly no longer be recognized. Conversely, with too low a level of the reference signal, the sensitivity could be increased too much and such a device would no longer be sufficiently robust with respect to extraneous light influences. The system could thus lose its operability in an undetected manner despite only one fault, namely the degradation of the reference target. In contrast, such safety relevant scenarios are precluded if the sensitivity is not adapted to the reference target measurement. A degradation of the reference target then only results in an availability problem, but not in a safety problem, and all conventional safety laser scanners work according to this principle.

It is also known to adjust the sensitivity for safety laser scanners in accordance with the prior art, but actually not in dependence on the reference target measurement. Look-up tables are rather stored from which the matching operating voltage for every operating temperature for the avalanche photodiode of the light receiver is looked for. However, only the parameter of temperature is thus naturally taken into account, and indeed in a very rigid and laborious manner.

EP 3 163 322 B1 discloses a safety laser scanner having a special internal reference target that simultaneously tests strong and weak remission. It is also mentioned in the introduction that the reference target measurement permits the monitoring and readjustment of a plurality of performance features and measurement results. However, this actually does not relate to the sensitivity, but to a distance offset. EP 3 163 322 B1 does not give any indication of the degradation of the reference target so that an adaptation of the sensitivity in dependence on the reference target measurement within its framework is excluded for the reasons discussed.

A light scanner having a light receiver that has at least one single photon avalanche diode is known from EP 3 091 271 A1. The level is monitored here using two reference targets in an embodiment. The double implementation of the reference targets is an alternative possibility of ensuring the single fault safety and of recognizing degradation. The method of EP 3 091 271 A1 differs in principle from a procedure in a safety laser scanner. Especially the use of two reference targets would mean substantial effort in a laser scanner and they would also take up construction space and thus even further increase the dead zone with respect to a 360° measurement.

WO 2015/077614 A1 uses a reference path to adapt the bias of an avalanche photodiode and thus its sensitivity. This has nothing to do with a safety relevant self test. In addition, a beam splitter is used to separate the measurement path and the reference path, which already considerably differs from a safety laser scanner in basic design.

There are also internal reference targets outside safety engineering. They frequently serve to correct the time of flight measurement by drifting of internal signal paths. EP 1 876 468 B1 is an example of this. Both a reference time of flight on an internal reference path and the actual time of flight on the external measurement path are measured there from a common start signal and the reference time of flight is used to remove drifting from the time of flight by calculation. This admittedly bears the common name of reference measurement and can even have a similar optical design, but has functionally nothing to do with the safety relevant self test.

It is also known to monitor the optical output power of a light transmitter using a monitor diode and to adapt is as necessary. However, this is not implemented in this manner in safety laser scanners in which no portion of the transmitted light is to be decoupled into a monitoring diode. Otherwise, it would only be a modified form of the internal reference target measurement that does not change anything in the above-described problem of single fault safety since the monitoring diode and the optical path thereto could also degrade.

SUMMARY

It is therefore the object of the invention to provide a safety laser scanner having an expanded use of reference target measurement.

This object is satisfied by a safety laser scanner for detecting objects in a monitored zone and by a method for maintaining its operability in accordance with the respective independent claim. A safety scanner laser scanner is a safe laser scanner in the sense of a safety standard such as initially described and may therefore be used for operator protection at danger sources. The safety laser scanner has a rotatable deflection unit, that is, for example, a rotating optics head having a light transmitter and a light receiver, or a rotating rotational mirror, and in this manner periodically scans a scanned plane or a monitored plane. At specific reference angle positions of the deflection unit, the transmitted light beam does not enter into the monitored zone, but is reflected internally at a reference target to generate a reference signal. The reference signal is therefore generated by the transmitted light beam itself, not only by a decoupled partial beam, for instance. The safety laser scanner is tested for operability using the reference signal.

The invention starts from the basic idea of nevertheless using the reference signal for an adaptation of the sensitivity of the detection even though the degradation, and thus a fault of the reference target, cannot be precluded. This breaks with conventional procedure that very deliberately only used the reference signal for monitoring or for the self test. The invention has therefore recognized that the prevailing conviction of losing safety by such adaptations was not correct. The reference signal is therefore not only tested in accordance with the invention, but its evaluation is also used as the basis for an adaptation. A measure for the level of the reference signal is in particular determined for this purpose, either as an instantaneous value or as a value acquired over a certain time interval such as an extremum, an integral, or an average, and a change of the level by an opposite adaptation of the sensitivity is at least partially compensated.

The change in the sensitivity can preferably only be restricted to a positive adaptation to a limited extent as in this case it can be particularly convincingly shown that safety is not impaired.

The invention has the advantage that safety laser scanners that are equipped with an adaptation of the total sensitivity or the sensitivity of the detection in accordance with the invention are very much more robust toward systematic fluctuations on the self test or on the monitoring of the detection sensitivity with the aid of the reference signal. (False) triggers of this self test are one of the main reasons for field returns with safety laser scanners. It is therefore a substantial advantage if aging effects and degradation of the reference target can be compensated at least to a limited effect. There is then a considerable improvement of the stability in the field and correspondingly fewer failures due to erroneous self diagnosis or also actual aging in the transmission/reception system over the long service life of such a unit of typically ten to twenty years. Contrary to expectations, the tolerance of the system with respect to single faults is maintained.

The control and evaluation unit is preferably configured to regulate the sensitivity to a desired sensitivity with the aid of the reference signal. The adaptation of the sensitivity is accordingly implemented as a control loop or as a readjustment for the bias point of the safety laser scanner that readjusts the total sensitivity of the device in dependence on the reference signal and in particular on its level. A desired sensitivity can here be specified as a fixed value to which regulation should take place or as a desired corridor at which the regulation only intervenes when the corridor is left.

The control and evaluation unit is configured to regulate the sensitivity in cycles that are at least ten times as long as the cycles in which the operability is checked with reference to the reference signal. The regulation of the sensitivity is therefore sluggish with the time steps also being able to be even substantially longer in the range of minutes or even hours and days as the drift effects and degradation effects to be compensated are very slow. Failures also occur after years or even decades with conventional devices without the adaptation of the sensitivity in accordance with the invention. A sluggish regulation is not only less laborious, but also prevents an escalation or unnecessary fluctuation of the measurement conditions.

The control and evaluation unit is preferably configured to change the sensitivity of the detection via the transmission power of the light transmitter. The optical output power of the light transmitter is one of the parameters that determines the sensitivity of the detection of the safety laser scanner. An adaptation via the transmission power or laser power is therefore possible. This is, however, only possible within the limits in which eye protection or the laser protection class are still observed.

The control and evaluation unit is preferably configured to change the sensitivity of the detection via an amplification of the light receiver and/or of an amplifier connected downstream of the light receiver. Alternatively or additionally, the total sensitivity of the sensor can be changed via an adaptation of the intensity of the transmitted light at the transmission side or by a change of the bias point of the transmission diode. There is the possibility here of changing the sensitivity of the light receiver itself, for instance via the voltage applied to an APD (avalanche photodiode) or a SPAD (single photon avalanche diode). In addition, a gain factor of an amplifier that is connected downstream of the light receiver can be changed.

The control and evaluation unit is preferably configured to change the sensitivity of the detection via a lowering of a detection threshold at which the received signal for detecting objects is evaluated. It can here be a true threshold operation, for instance one or more thresholds that localize a received pulse or also threshold criteria with which, for example, a digitized received signal is evaluated.

The control and evaluation unit is preferably configured to only increase the sensitivity of the detection with respect to a starting value. The sensitivity is therefore only tracked in one direction when the reference signal becomes too weak. The one half of the possible safety problems is thus precluded, namely too insensitive a system with detection gaps for distant and/or for weakly remitting objects since no change is made in this direction. A safety relevant shutdown preferably thus takes place as conventionally when the reference signal becomes too strong due to degradation. It would still be conceivable here to take back earlier adaptations again toward a more sensitive system, but not to lower the sensitivity so much that it falls below the starting value.

The control and evaluation unit is preferably configured to change the sensitivity of the detection with respect to a starting value on taking into operation by at most 30%. In connection with the tracking in only one direction explained in the previous paragraph, this means a limited positive adaptation. The limit is set because the sensitivity may not become too large so that the robustness with respect to extraneous light is lost. The limit at 30% is a consequence of a general system and safety observation; it continues to guarantee safety and nevertheless leaves some leeway for adaptations. Tighter limits, for example at 10% or 20%, or also more generous limits at 40% or 50%, are conceivable, but this will either be at the cost of the leeway or will require a detailed observation whether safety is really still ensured.

The safety laser scanner is preferably configured as a distance measurement device in that the control and evaluation unit determines the time of flight between the transmission and the reception of the light beam and determines the distance of an object from said time of flight. Substantially more accurate object information can thus be acquired than by a mere determination of the presence of objects. An angle measurement unit is preferably provided for detecting the angular position of the deflection unit. Complete two-dimensional position coordinates are then available overall for detected objects. In the case of a spatially extended monitored zone, the respective tilt angle of the scanning unit is also detected so that overall three-dimensional spherical coordinates are obtained which likewise completely describe the object position within the monitored zone.

The control and evaluation unit is preferably configured to measure the distance from the internal reference target on the check of the operability. The distance measurement is thus also checked that produces the distance expected for the reference target with a correctly working safety laser scanner. The reference signal is in particular evaluated for this purpose just like the received signal. It makes no difference for the core of the measurement whether the transmitted light beam is reflected externally at a measurement object or internally at the reference target. It is, for example, known that it is a reference measurement due to the current adjustment angle of the deflection unit in accordance with the dead angle range with the reference target.

The safety light scanner preferably has a safety output, with the control and evaluation unit being configured to determine whether an object is located in a protected field within the monitored zone and thereupon to output a safety-relevant shutdown signal via the safety output. The safety evaluation is thus already integrated in the safety laser scanner that directly provides a safety relevant shutdown signal for a machine or for an interposed safety control.

The control and evaluation unit is preferably configured to output a safety relevant shutdown signal over the safety output if the check of the operability does not produce any error-free function. The safety shutdown thus also takes place just as in the case of an object intrusion into a protected field when the self test via the reference target measurement reveals a problem. This can be a reference target measured at a false distance, or a false level and in particular too small a level of the reference signal that can no longer be compensated by changes of the sensitivity, for instance because the system can no longer reach the required sensitivity at all or would have to depart from the permitted range of, for example, 30%.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The only FIGURE of the drawing shows in:

FIG. 1 a schematic sectional representation of a safety laser scanner;

FIG. 1 shows a schematic sectional representation through a safety laser scanner 10. Safety laser scanner 10 means that a use is possible in operator protection, that is measurements have been taken in accordance with the standards named in the introduction that preclude an unrevealed failure of the function in accordance with the safety level or performance level.

DETAILED DESCRIPTION

A light transmitter 12, for example having a laser light source, generates, with the aid of a transmission optics 14, a transmitted light beam 16 which is deflected at a deflection unit 18 into a monitored zone 20. If the transmitted light beam 16 is incident on an object in the monitored zone 20, remitted light 22 again moves back to the safety laser scanner 10 and is there detected via the deflection unit 18 and by means of a reception optics 24 by a light receiver 26, for example a photodiode or an APD (avalanche photodiode).

The deflection unit 18 is configured in this embodiment as a rotating mirror which rotates continuously by the drive of a motor 28. The respective angular position of the motor 28 or of the deflection unit 18 is recognized via an encoder which, for example, includes a code disk 30 and a forked light barrier 32. The light beam 16 generated by the light transmitter 12 thus sweeps over the monitored zone 20 generated by the rotational movement. Instead of a rotating mirror, it is also possible to configure the deflection unit 18 as a rotating optics head in which the light transmitter 12 and/or the light receiver 26, and possibly further elements, are accommodated. The design of the transmission optics 14 and reception optics 24 can also be varied, for instance via a beam-shaping mirror as a deflection unit, another arrangement of the lenses or additional lenses. Safety laser scanners are in particular also known in a coaxial arrangement, that is with a common optical axis of the light transmitter 12 and of the light receiver 26. In the embodiment shown, the light transmitter 12 and the light receiver 26 are accommodated together on a printed circuit board 34. This is also only an example since separate printed circuit boards and other arrangements, for example with a mutual vertical offset, can be provided.

If now remitted light 22 is received from the monitored zone 20 by the light receiver 26, a conclusion can be drawn on the angular position of the object in the monitored zone 20 from the angular position of the deflection unit 18 measured by the encoder 30, 32. In addition, the time of flight from the transmission of a light signal up to its reception after reflection at the object in the monitored zone 20 is preferably determined and a conclusion is drawn on the distance of the object from the laser safety laser scanner 10 using the speed of light.

This evaluation takes place in an evaluation unit 36 which is connected for this purpose to the light transmitter 12, to the light receiver 26, to the motor 28 and to the encoder 32. Two-dimensional polar coordinates of all objects in the monitored zone 20 are thus available via the angle and the distance. In a technical safety application, the evaluation unit 36 checks whether a non-permitted object intrudes into a protected zone fixed within the monitored zone 20. If this is the case, a securing signal is output via a safety output 38 (OSSD, output signal switching device) to a monitored hazard source, for example to a machine. There can be additional interfaces, not shown, for outputting raw or preprocessed measurement data or, for example, for parameterizing the safety laser scanner 10.

For a self test of the operability of the safety laser scanner 10, a reference target 40 is arranged in an angular range of the safety laser scanner 10 that is shown offset in the FIG. 1 by just 180° from the transmitted light beam 16 and from remitted light 22. If the deflection unit 18 adopts corresponding angular positions in the course of its rotational movement, the transmitted light beam 16 does not depart from the safety laser scanner 10, but is reflected within the safety laser scanner 10 by the reference target 40. The light receiver 26 in this case does not generate a received signal for detecting objects in the monitored zone 20, but rather a reference signal that is used for a functional test and for sensitivity adaptation. A dead zone of the measurement is disposed in the angular range that the reference object 40 adopts so that the safety laser scanner 10 cannot detect a full angular range of 360°. As shown, lines can be guided in this dead region or, with alternative arrangements of the motor, its suspension can be accommodated therein. All the named functional components are arranged in a housing 42 which has a front screen 44 in the region of the light exit and of the light entry.

As already explained in the introduction, the reference signal is evaluated to check the operability of the safety laser scanner 10. This test preferably takes place in short cycles once per revolution of the deflection unit 18. If the control and evaluation unit does not measure the reference target 40 at the expected distance, this is an error and the safety laser scanner 10 moves into the securing state with an output of a safety relevant shutdown signal at the safety output 38. If the level of the reference signal differs from a desired value, this, however, differently from the conventional procedure, does not directly result in a safety relevant shutdown signal.

The sensitivity of the safety laser scanner 10 is rather at least adapted within a certain framework to compensate the difference of the reference signal. An implementation possibility is a control loop that provides by adaptation of the sensitivity that the reference signal remains on a desired value or within a desired corridor. Different options are available for the adaptation of the sensitivity that can be used singly or in combination. It is thus conceivable to increase the optical output power of the light transmitter 12. It should be observed here that a higher laser power does not result in a deviation from the qualified laser protection class. A further option provides for the amplification in the reception path, and indeed both the amplification of the light receiver 26 itself, for instance a bias of an APD, that is also a gain factor of an amplifier arranged downstream. Finally, there is also the option of evaluating at different sensitivities, in particular to change detection thresholds.

Contrary to the conviction discussed in the introduction that the observation of the single fault safety would not be ensured if the sensitivity is adapted on the basis of the reference signal, the invention shows on a safety relevant observation of the influences of a regulation of the total sensitivity that an increase in the sensitivity is nevertheless possible to a limited extent in the operation of a safety laser scanner 10. A higher sensitivity, for instance by raising the gain of the light receiver 26, does not have the result that the device becomes too sensitive to disruptive influence such as extraneous light.

The sensitivity should, however, not be increased so much that noticeably more incorrect shutdowns occur due to the unwanted detection of uncritical objects such as aerosols and the like. On a readjustment of up to more than 30%, in particular by adapting the receiver gain, some degradation of the reference target 40 is very easily compensated without significantly influencing the total performance of the safety laser scanner 10 in practice, i.e. the detection capability or dust sensitivity. A degradation of the reference target 40 is here assumed as the reason for the change of the reference signal. Equally, actual degradation or drifting in the actual transmission/reception system and thus in the measurement of objects in the monitored zone 20 are also removed by regulation to said limited extent.

A regulation of the sensitivity on the basis of the reference signal should furthermore be carried out so sluggishly that there is no escalation. This is also unproblematic because the level of the reference signal typically only drifts very slowly.

The regulation was previously only described in the direction toward greater sensitivities. A regulation or adaptation in the opposite direction toward smaller sensitivities must be treated with great care since it may not occur under any circumstances that a dark object at a great distance is overlooked. However, since it has been found within the framework of the invention that a higher sensitivity is nevertheless possible, a certain leeway for a negative tracking toward lower sensitivities could also be conceivable.

The invention was described for a safety laser scanner 10. In general, it can, however, also be transferred to any safety relevant sensor system that periodically checks its sensitivity by means of a reference target 40 or by means of the reference signal acquired with its aid.

The invention claimed is:

1. A safety laser scanner for detecting objects in a monitored zone, the safety laser scanner comprising:
   a light transmitter for transmitting a light beam into the monitored zone;
   a light receiver for generating a received signal from the light beam remitted by the objects;
   a rotatable deflection unit for a periodic deflection of the light beam to scan the monitored zone in the course of the movement;
   an internal reference target that reflects the transmitted light beam within the safety laser scanner to the light receiver to generate a reference signal; and
   a control and evaluation unit that detects objects with reference to the received signal, checks the operability of the safety laser scanner with reference to the reference signal, and changes the sensitivity of the detection in dependence on the reference signal,
   wherein the control and evaluation unit increases the sensitivity of the detection only with respect to a starting value.

2. The safety laser scanner in accordance with claim 1, wherein the control and evaluation unit regulates the sensitivity to a desired sensitivity with the aid of the reference signal.

3. The safety laser scanner in accordance with claim 2, wherein the control and evaluation unit regulates the sensitivity in cycles that are at least ten times as long as the cycles in which the operability is checked with reference to the reference signal.

4. The safety laser scanner in accordance with claim 1, wherein the control and evaluation unit changes the sensitivity of the detection via the transmission power of the light transmitter.

5. The safety laser scanner in accordance with claim 1, wherein the control and evaluation unit changes the sensitivity of the detection via an amplification of the light receiver and/or of an amplifier connected downstream of the light receiver.

6. The safety laser scanner in accordance with claim 1, wherein the control and evaluation unit changes the sensitivity of the detection via a lowering of a detection threshold at which the received signal for detecting objects is evaluated.

7. The safety laser scanner in accordance with claim 1, wherein the control and evaluation unit changes the sensitivity of the detection with respect to a starting value on taking into operation by at most 30%.

8. The safety laser scanner in accordance with claim 1, that is configured as a distance measurement device in that the control and evaluation unit determines the time of flight between the transmission and the reception of the light beam and determines a distance of an object from it.

9. The safety laser scanner in accordance with claim 8, wherein the control and evaluation unit measures the distance from the internal reference target on the check of the operability.

10. The safety laser scanner in accordance with claim 1, wherein an angle measurement unit is provided for detecting the angular position of the deflection unit.

11. The safety laser scanner in accordance with claim 1, that is configured as a distance measurement device in that the control and evaluation unit determines the time of flight between the transmission and the reception of the light beam and determines a distance of an object from it; wherein an angle measurement unit is provided for detecting the angular position of the deflection unit.

12. The safety laser scanner in accordance with claim 11, wherein the control and evaluation unit measures the distance from the internal reference target on the check of the operability.

13. The safety laser scanner in accordance with claim 1, which has a safety output, wherein the control and evaluation unit determines whether an object is located in a protected field within the monitored zone and thereupon to output a safety relevant shutdown signal via the safety output.

14. The safety laser scanner in accordance with claim 13, whereon the control and evaluation unit outputs a safety relevant shutdown signal over the safety output if the check of the operability does not produce any error-free function.

15. A method of maintaining the operability of a safety laser scanner that detects objects in a monitored zone, the method comprising the steps of
   periodically deflecting a transmitted light beam by a rotating deflection unit; generating a received signal from the light beam remitted by objects in the monitored zone; and
   evaluating the received signal to detect objects, wherein, to check the operability, a reference signal is evaluated that is generated at an internal reference target that is arranged such that it reflects the transmitted light beam within the safety laser scanner,
   wherein the sensitivity of the detection is changed in dependence on the reference signal,
   and wherein the control and evaluation unit increases the sensitivity of the detection only with respect to a starting value.

16. A safety laser scanner for detecting objects in a monitored zone, the safety laser scanner comprising:
   a light transmitter for transmitting a light beam into the monitored zone;
   a light receiver for generating a received signal from the light beam remitted by the objects;
   a rotatable deflection unit for a periodic deflection of the light beam to scan the monitored zone in the course of the movement;
   an internal reference target that reflects the transmitted light beam within the safety laser scanner to the light receiver to generate a reference signal; and
   a control and evaluation unit that detects objects with reference to the received signal, checks the operability of the safety laser scanner with reference to the reference signal, and changes the sensitivity of the detection in dependence on the reference signal, wherein the safety laser scanner has is configured as a distance measurement device in that the control and evaluation unit determines the time of flight between the transmission and the reception of the light beam and determines a distance of an object from it,
and wherein an angle measurement unit is provided for detecting the angular position of the deflection unit.

17. The safety laser scanner in accordance with claim 16, wherein the control and evaluation unit measures the distance from the internal reference target on the check of the operability.

\* \* \* \* \*